US012729162B2

(12) United States Patent
Xi et al.

(10) Patent No.: US 12,729,162 B2
(45) Date of Patent: Sep. 8, 2026

(54) BIOCHAR FOR STABLE SOLIDIFICATION OF HEAVY METALS

(71) Applicant: CHINESE RESEARCH ACADEMY OF ENVIRONMENTAL SCIENCES, Beijing (CN)

(72) Inventors: Beidou Xi, Beijing (CN); Lei Wang, Beijing (CN); Lan Jiang, Beijing (CN); Yan Shao, Beijing (CN); Nan Xu, Beijing (CN); Shaofeng Li, Beijing (CN); Yangyang Wang, Beijing (CN); Xiaoshu Wang, Beijing (CN); Jinsheng Wang, Beijing (CN); Ming Chang, Beijing (CN); Gen Zhang, Beijing (CN); Hui Wang, Beijing (CN); Honghu Zeng, Beijing (CN); Xianghua Xiao, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 498 days.

(21) Appl. No.: 18/549,902

(22) PCT Filed: Mar. 14, 2022

(86) PCT No.: PCT/CN2022/080624

§ 371 (c)(1),
(2) Date: Sep. 9, 2023

(87) PCT Pub. No.: WO2022/199410

PCT Pub. Date: Sep. 29, 2022

(65) Prior Publication Data

US 2024/0174572 A1 May 30, 2024

(30) Foreign Application Priority Data

Mar. 26, 2021 (CN) ......................... 202110328481.9

(51) Int. Cl.

| | |
|---|---|
| ***C04B 33/132*** | (2006.01) |
| ***C02F 1/68*** | (2023.01) |
| ***C02F 3/32*** | (2023.01) |
| ***C02F 101/20*** | (2006.01) |
| ***C04B 33/04*** | (2006.01) |
| ***C04B 33/32*** | (2006.01) |
| ***C10B 53/02*** | (2006.01) |
| ***C10B 57/02*** | (2006.01) |
| ***C10B 57/06*** | (2006.01) |
| ***C10B 57/14*** | (2006.01) |
| ***C10B 57/16*** | (2006.01) |

(52) U.S. Cl.

CPC .......... *C04B 33/1327* (2013.01); *C02F 1/683* (2013.01); *C04B 33/04* (2013.01); *C04B 33/32* (2013.01); *C10B 53/02* (2013.01); *C10B 57/02* (2013.01); *C10B 57/06* (2013.01); *C10B 57/14* (2013.01); *C10B 57/16* (2013.01); *C02F 3/327* (2013.01); *C02F 2101/20* (2013.01); *C04B 2235/349* (2013.01); *C04B 2235/422* (2013.01); *C04B 2235/48* (2013.01); *C04B 2235/6567* (2013.01); *C04B 2235/661* (2013.01)

(58) Field of Classification Search

CPC ..... C04B 33/1327; C04B 33/04; C04B 33/32; C04B 2235/349; C10B 57/06; C02F 3/327; C02F 2101/20

See application file for complete search history.

(56) References Cited

FOREIGN PATENT DOCUMENTS

CN 109181704 A * 1/2019 ............. C09K 17/40

* cited by examiner

*Primary Examiner* — Laura A Auer
(74) *Attorney, Agent, or Firm* — CBM PATENT CONSULTING, LLC

(57) ABSTRACT

A biochar is produced by co-pyrolysing an aquatic plant enriched with heavy metals with a clay mineral, and the aquatic plants themselves have high enrichment and adsorb heavy metals in contaminated water; heavy metals are in situ adsorbed, and are coated or enriched in the biochar, therefore extending the migration time of heavy metals, which are also very stable; attapulgite and montmorillonite as clay minerals are loaded in the biochar during the preparing process; heavy metals contained in the biochar play a catalytic role, and synergy with activated attapulgite, therefore increasing the reliability of the biochar, and effectively reducing the ecological effectiveness and potential risk of heavy metals in the biochar.

9 Claims, No Drawings

BIOCHAR FOR STABLE SOLIDIFICATION OF HEAVY METALS

TECHNICAL FIELD

The present invention relates to the field of environmental manufacturing technology and specifically relates to a biochar that stably solidifies heavy metals.

BACKGROUND ART

Soil is an important substance basis for human survival and development, and its physicochemical properties affect the growth of plants and the health of humans. In recent years, with the rapid development of urbanization and agriculture, soils are increasingly polluting, industrial activities such as mining and metallurgy are more accelerating the migration of pollutants, contamination of soil and surface, groundwater resources. Unlike organic pollution of soil, heavy metal pollution cannot degrade naturally, and if the food chain enters the body, heavy metals can affect the body's kidneys, liver, nervous system and brain, and even carry the risk of teratogenic, cancer-treating and mutagenic mutations.

Currently, phytoremediation technologies in soil heavy metal remediation technologies utilize highly enriched plants such as corn, which is planted in heavy metal contaminated soil, and is harvested after maturation, therefore enabling removal of heavy metals from contaminated sites. This technology is easy to operate and has a wide range of applications. But the problem arises from enriching large amounts of heavy metals in polluted sites within the plant body, which, although reducing the environmental risk of soil, results in large amounts of polluted biomass that cannot be degraded, thus creating the potential for secondary pollution of soil and groundwater.

Studies have shown that production of biochar from phytoremediation biomass works well for holding heavy metals, and that pyrolysis product, namely biochar, has great potential for application, but such biochar is dangerous to release heavy metals during constant aging, severely limiting application of such biochar.

In view of above reasons, there is great need for further investigation into preparation of biochar for enriching heavy metal to investigate a biochar for solidification of heavy metal with high stability.

SUMMARY OF THE INVENTION

In order to overcome the above problems, the present inventors have conducted research on biochar, and provide a biochar for stable solidification of heavy metals. The biochar is produced by co-pyrolysing an aquatic plant enriched with heavy metals with a clay mineral, and the aquatic plants themselves have high enrichment and adsorb heavy metals in contaminated water. Heavy metals are in situ adsorbed, and are coated or enriched in the biochar, therefore extending the migration time of heavy metals, which are also very stable. Attapulgite and montmorillonite as clay minerals are loaded in the biochar during the preparing process. Heavy metals contained in the biochar play a catalytic role, and synergy with activated attapulgite, therefore increasing the reliability of the biochar, and effectively reducing the ecological effectiveness and potential risk of heavy metals in the biochar, thereby completing the present invention.

In particular, it is an object of the present invention to provide a biochar that stably solidifies heavy metals, wherein the biochar is produced by co-pyrolysis of a biomass with clay minerals, and the biomass is obtained from plants cultivated in heavy metal-containing environments.

Beneficial effects of the present invention include:

(1) The biochar provided according to the invention, is coated or enriched with heavy metal elements by in situ adsorption, therefore extending the migration time of heavy metals, which is also very stable.

(2) The process for producing the biochar according to the present invention provides high loading of heavy metals and reduces the dissolution rate of heavy metals.

(3) The process for producing the biochar according to the present invention, loads attapulgite and montmorillonite as clay minerals in the biochar and increases the reliability and durability of the biochar, thereby effectively reducing the ecological effectiveness and potential risk of heavy metals in the biochar.

DETAILED DESCRIPTION OF INVENTION

The present invention will be described in more detail through embodiments and examples. Through these descriptions, the features and advantages of the present invention will become clearer.

The term "exemplary" as used herein is intended to be "serving as an example, an illustrative embodiment, or an embodiment". Any of the embodiment(s) described herein as "exemplary" need not be construed as preferred as or better than other embodiment(s).

An object of the present invention is to provide a biochar for stable solidification of heavy metals. The biochar is produced by co-pyrolysis of a biomass with clay minerals, and the biomass is obtained from plants cultivated in heavy metal-containing environments.

In accordance with the present invention, heavy metal waste waters are unwieldy due to the very wide source of waste waters and the amount of waste waters is huge, including waste waters in the industries of electroplating, metal surface treatment, electroless deposition, anodizing treatment, grinding, etching and the like, and are therefore unwieldy for the treatment of waste waters containing heavy metals. It is preferable to treat heavy metals in waste waters with aquatic plants.

In the present invention, said aquatic plants include any one or more of emergent plants, floating leaf plants, submerged plants, floating plants, preferably emergent plants, such as water lettuce, squid, taro, iris, etc., more preferably iris.

According to the invention, aquatic plants themselves have characteristic morphologies, wherein, roots, stems, leaves form intact, developed ventilated tissue, guaranteeing the need for oxygen for organs and tissues; developed root system tissues, guaranteeing uptake of individual nutrients, etc. The presence of these aerated tissues is advantageous for increasing the porosity of the produced biochar and thus the stability of the biochar. In particular as a represent of emergent plants, iris is robust in rhizomes and resistant to drought and moisture, and has excellent uptake or adsorption of heavy metal elements such as Cu, Pb, Ni.

According to the invention, in order to effectively enrich heavy metals in the sewage during the growth of aquatic plants, it is preferred to add to the sewage a chelating agent such as EDTA, which preferably a metal chelate of EDTA, such as Fe-EDTA, EDTA-2Na etc., more preferably EDTA-2Na.

In the present invention, EDTA is a multidentate ligand that complexes with metal ions to produce chelates with multiple five-membered rings, and resulting chelates are very stable.

The present inventors have found that, EDTA-2Na is readily soluble in water, has a better chelation, and is advantageous in promoting the uptake or adsorption of heavy metal elements by aquatic plants.

In further studies, since excessive EDTA chelates with heavy metals in environment, causing diffusion of heavy metals and heavily polluting environment. When the concentration of sodium (Na) element in EDTA-2Na is 50-150 mg/L, it is not only guarantees stable growth of aquatic plants and high enrichment of heavy metals, but also does not pollute environment in heavy metal soil applications.

In further preferred embodiment, the concentration of Na element in EDTA-2Na is 80-110 mg/L.

In even further preferred embodiment, the concentration of Na element in EDTA-2Na is 90-100 mg/L.

According to the present invention, said heavy metals in the sewage water include Cu, Pb, Ni, etc., and the concentration of Cu element is 300-500 mg/L, that of Pb element is 100-400 mg/L and that of Ni element is 300-600 mg/L, in order to guarantee normal growth of aquatic plants in the sewage water while efficiently enriching heavy metals.

Preferably, the concentration of Cu element is 350-450 mg/L, that of Pb element is 200-300 mg/L and that of Ni element is 400-500 mg/L.

More preferably, the concentration of Cu element is 380-400 mg/L, that of Pb element is 250-270 mg/L and that of Ni element is 450-480 mg/L.

In the present invention, in order to further ensure enrichment of heavy metal elements by aquatic plants, the planting period of aquatic plants is as long as possible. The inventors have found that, a planting period of 20 days or more is necessary for aquatic plants to be enriched with heavy metal elements, a planting period of 30 days or more is more advantageous, and more preferably a planting period of 60 days.

According to the present invention, aquatic plants absorb heavy metal elements, and transmitting heavy metal elements to tissues such as roots, stems, leaves, and the like. Thus, the whole of the aquatic plant, including roots, stems, leaves, may be used as the biomass. The biomass is preferably dried in an environment at 80-150° C., preferably at 90-120° C., more preferably at 100-110° C., to facilitate subsequent biochar preparation.

In the present invention, the biomass is preferably co-pyrolysed with clay minerals, in order to increase the stability of the biochar and reduce the mobility of heavy metals in the soil.

Said clay mineral acts as a passivator, reducing mobilization and dissolution of heavy metals. Clay minerals include any one or more of kaolinite, montmorillonite, attapulgite, luretolite, silica, preferably a mixture of attapulgite and montmorillonite.

In the present invention, the attapulgite is essentially a fibrous crystal comprising a layer structure and a chain structure, has a large specific surface area, comprising nanochannels, and strong ion exchange capacity and good adsorption, sustained release and suspension. Unique physical structure and chemical properties of attapulgite result in unique electrochemical stability and plasticity of physical properties. Attapulgite also has good water absorption and water retention, and it does not shrink after water absorption drying, therefore is better stable in salt water and high temperature environments.

In the present invention, the montmorillonite is a layered mineral composed of an aqueous aluminosilicate with very fine particles, a clay mineral with a three-layered sheet-like structure composed of siloxyl tetrahedra on top of and above. Furthermore, since there is water and exchangeable cations between the layers of the crystal structure, both ion exchange capacity and water swelling capacity are high, and thus it is advantageous to improve the water retention of the biochar.

According to the present invention, the dry weight ratio of attapulgite, montmorillonite and the biomass is (0.5-5.0):(0.2-3.0):1, preferably (1.0-3.0):(0.8-2.0):1, and more preferably (2.0-2.1):(1.3-1.5):1.

In the present invention, the cation exchange capacity of the biochar is gradually increased as the content of attapulgite to montmorillonite is increased and the activation capacity is increased. When the dry weight ratio of attapulgite, montmorillonite and the biomass is (0.5-5.0):(0.2-3.0):1, the biochar is produced with the largest specific surface area and the strongest ability to stabilize the heavy metals.

According to the invention, in order to further improve the stability of the biochar, the biomass, attapulgite and montmorillonite are preferably wet blended and subjected to a pyrolysis reaction, in particular:

forming a suspension of attapulgite in water, wherein the weight of said attapulgite is 30-70% of the water; adding montmorillonite to the suspension of attapulgite, stirring for 2-8 h to form a suspension solution; adding the biomass to the suspension solution, stirring for 3-10 h, and keeping in an environment of 50-100° C. for 3-12 h, in order to remove part of the moisture and facilitate the subsequent pyrolysis reaction process, so as to form a porous structure on the surface of the biochar and to increase stability of the biochar.

Furthermore, the suspension of attapulgite is formed in water, and the weight of attapulgite is 40-60% of the water, and then montmorillonite is added to the suspension of attapulgite, and stirred for 3-6 h to form the suspension solution. At last, the biomass is added to the suspension solution, stirred for 5-8 h, and kept at 60-90° C. for 5-8 h.

Still further, the suspension of attapulgite is formed in water, and the weight of attapulgite is 45-48% of the water, and then montmorillonite is added to the suspension of attapulgite, and stirred for 3 h to form the suspension solution. Then the biomass is added to the suspension solution, stirred for 7 h, and kept at 70° C. for 6 h.

According to the present invention, the biomass and the clay mineral are preferably crushed prior to blending, in order to increase the contact area during blending and are more uniformly dispersed. Wherein, attapulgite is crushed to a particle size of 0.5-10 μm, montmorillonite is crushed to a particle size of 0.1-5 μm, and the biomass is crushed to a particle size of 0.5-6 μm; preferably attapulgite is crushed to a particle size of 1-5 μm, montmorillonite is crushed to a particle size of 0.5-2 μm, and the biomass is crushed to a particle size of 1-3 μm; more preferably, attapulgite is crushed to a particle size of 2-3 μm, montmorillonite is crushed to a particle size of 1-1.5 μm, and the biomass is crushed to a particle size of 1.5-2 μm.

The inventors found that, the cation exchange capacity of the biochar is significantly enhanced, where the biochar is produced by pyrolysis of clay minerals and the biomass enriched with heavy metals, thereby effectively reducing the ecological effectiveness and potential risk of heavy metals in the biochar, and effectively avoiding secondary pollution to the environment. The dissolution rate of heavy metals is also significantly reduced, and the activation of clay minerals during pyrolysis is significantly enhanced, resulting in increased surface roughness and expanded specific surface area of the biochar.

In the present invention, said pyrolysis comprises two stages of low temperature pyrolysis and high temperature pyrolysis, as follows:

Low temperature pyrolysis stage: the pyrolysis temperature is 200-400° C., and the pyrolysis time is 1.0-4.0 h;

High temperature pyrolysis stage: the pyrolysis temperature is 480-750° C., and the pyrolysis time is 0.5-3.0 h.

In the present invention, since the pyrolysis process is divided into two stages, clay minerals can significantly increase the chemical stability of biochar, and coating or enrichment of heavy metal elements is also favored. In the low temperature pyrolysis stage, with increasing levels of carbon, hydrogen, oxygen, nitrogen, sulfur elements as temperature increases, the yield of biochar increases. In the high temperature pyrolysis stage, the yield of biochar gradually decreases as pyrolysis temperature increases, the ash content rises, and the pH of biochar also rises significantly.

Without being bound by any theory, the inventors believe that the reason for this phenomenon is: as the pyrolysis temperature increases, significant amounts of organic components in the biomass are decomposed and produce significant amounts of gases such as $CO_2$, $N_2$, or are transferred into aromatic structures, resulting in increased and decreased power production of the biochar; Moreover, the organic components decompose and are transferred partially by polycondensation into the inorganic components, resulting in the rise of ash content; at the same time, the decomposition of a large number of oxygenated functional groups causes the biochar pH to increase as the degree of aromatization increases as the pyrolysis temperature increases, the stability of the biochar greatly increases. In addition, the specific surface area of the biochar increases as the pyrolysis temperature increases.

Further, the temperature and time of the low temperature pyrolysis and the high temperature pyrolysis are, respectively:

Low temperature pyrolysis stage: the pyrolysis temperature is 250-350° C., and the pyrolysis time is 1.5-3.0 h;

High temperature pyrolysis stage: the pyrolysis temperature is 480-750° C., and the pyrolysis time is 1.0-2.5 h.

Still further, the temperature and time of the low temperature pyrolysis and the high temperature pyrolysis are, respectively:

Low temperature pyrolysis stage: the pyrolysis temperature is 280-320° C., and the pyrolysis time is 2.0-2.5 h;

High temperature pyrolysis stage: the pyrolysis temperature is 600-700° C., and the pyrolysis time is 1.5-2.0 h.

In accordance with the present invention, the dissolution rate of heavy metals is drastically reduced where the biochar is in an environment with a pH of 4-12.

In the present invention, the biochar is enriched with Ni in a total amount of 30 mg/g or more, preferably 35 mg/g or more, more preferably 37 mg/g or more; enriched with Pb in a total amount of 85 mg/g or more, preferably 88 mg/g or more, more preferably 90 mg/g or more; enriched with Cu in a total amount of 10 mg/g or more, preferably 13 mg/g or more, more preferably 15 mg/g or more.

EXAMPLES

The invention is further described below by way of specific examples, which are, however, merely illustrative and do not constitute any limitation on the scope of protection of the invention.

Example 1

(1) Iris Siberica is planted in an incubator with Morade broth. After 5 days, a solution of EDTA-2Na having a concentration of 90 mg/L of the Na element is added to the incubator. After 5 days, a solution of copper sulfate having a concentration of 390 mg/L of Cu element, a solution of lead nitrate having a concentration of 260 mg/L of Pb element and a solution of nickel sulfate heptahydrate ($H_2SO_4 \cdot 7H_2O \cdot Ni$) having a concentration of 460 mg/L of Ni element are added in the incubator, to simulate contaminated water, which is cultured for 60 days during which the pH of the aqueous solution in the incubator is maintained to be in the range of 5.9 to 6.0. The roots, stems and leaves of iris Siberian are collected after the end of the experiment, and are dried in an environment with a temperature of 100° C., and then are crushed to a particle size of 1.6 m, to obtain a biomass.

(2) Attapulgite, montmorillonite and biomass (on a dry weight basis) in a weight ratio of 2.0:1.5:1 are subjected to the following: Attapulgite is crushed to a particle size to 2.5 μm, and montmorillonite is crushed to a particle size to 1.5 μm. The attapulgite is added into water to form a suspension, in which the weight of attapulgite is 46% of the water, and then montmorillonite is added to the suspension of attapulgite, which is stirred for 3 h to form a suspension solution, to which the biomass obtained in step (1) is added, after continued stirring for 7 h and holding at 70° C. for 6 h, a pre-fired mass is obtained.

(3) The pre-fired mass is pyrolysed in the following reaction stages:

Low temperature pyrolysis stage: the pyrolysis temperature is 300° C., and the pyrolysis time is 2.5 h;

High temperature pyrolysis stage: the pyrolysis temperature is 680° C., and the pyrolysis time is 1.5 h.

Biochar is obtained after completion of pyrolysis.

Reference "Microwave Digestion Method for Total Soil Heavy Metal (HJ832-2017)", 0.400 g of the biochar is accurately weighed and placed in a polytetrafluoroethylene digestion tank, 18 mL of concentrated nitric acid and 6 mL of concentrated HC1 are added, allowed to react upon standing for 12 h, and then are put into a microwave digester for digestion, to obtain a digestion liquor. After digestion is completed, the digestion liquor is transferred to a 250 mL volumetric flask, brought to volume up to the mark, shaken well and passes through a 0.45 μm water-based filtration membrane. The contents of the heavy metals: Cu, Pb and Ni are measured by ICP-OES, converted to the content of the heavy metals in the biochar solids, namely: a total enrichment of 16 mg/g for Cu, a total enrichment of 90 mg/g for Pb and a total enrichment of 38 mg/g for Ni.

Example 2

The biochar is prepared in a similar manner to Example 1 except that:

The concentration of Cu element in the solution of copper sulfate is 380 mg/L, the concentration of Pb element in the solution of lead nitrate is 270 mg/L, and the concentration of Ni element in nickel sulfate heptahydrate is 450 mg/L.

After completion of the pyrolysis a biochar is obtained, in which having total enrichment of 14.7 mg/g for Cu, 87.2 mg/g for Pb, and 36 mg/g for Ni.

Example 3

The biochar is prepared in a similar manner to Example 1 except that:

Low temperature pyrolysis stage: the pyrolysis temperature is 320° C., and the pyrolysis time is 2.0 h;

High temperature pyrolysis stage: the pyrolysis temperature is 600° C., and the pyrolysis time is 1.5 h.

After completion of the pyrolysis a biochar is obtained, in which having total enrichment of 14.6 mg/g for Cu, 87.3 mg/g for Pb, and 36 mg/g for Ni.

COMPARATIVE EXAMPLES

Comparative Example 1

The biochar is prepared in a similar manner to Example 1 except that:

Wherein, no montmorillonite and attapulgite are added, and resulting a biochar having total enrichment of 9.8 mg/g for Cu, 72 mg/g for Pb, and 30 mg/g for Ni.

EXPERIMENTAL EXAMPLES

Experimental Example 1

Dissolved heavy metals in material (the content of which can be obtained by deionized water leaching) can bind directly to microorganisms in soil or water body, having high environmental risks, and high or low concentration can reflect some extent migratory conversion capacity and ecotoxicity of heavy metals.

Reference Environmental Protection Standard “Solid Waste Leaching Toxic Leaching Method (HJ 557-2009)”, 0.4 g each of the biochar of Examples 1-3 and Comparative Example 1 is weighed and placed in a 500 mL Erlenmeyer flask, respectively, and 200 mL of deionized water is added. The bottles are closed with parafilm, and the Erlenmeyer flasks are placed in a thermostat shaking box and shaken at 25° C. for 8 h with a frequency of 110/min. After completion of shaking, leaving to stand for 16 h, the supernatant is taken out and brought to a volume of 200 mL, and then passed through a 0.45 μm water-based filtration membrane. The elemental contents of Cu, Pb and Ni in the filtrate are determined by ICP-OES, and the results are shown in Table 1:

TABLE 1 content and dissolution rate of dissolved heavy metals in biochar

| | $Cu^{2+}$ | | $Pb^{2+}$ | | $Ni^{2+}$ | |
|---|---|---|---|---|---|---|
| Sample | Dissolution Concentration (mg/g) | Dissolution rate (%) | Dissolution Concentration (mg/g) | Dissolution rate (%) | Dissolution Concentration (mg/g) | Dissolution rate (%) |
| Example 1 | 0.113 | 0.71 | 0.792 | 0.88 | 0.847 | 2.23 |
| Example 2 | 0.113 | 0.77 | 0.794 | 0.91 | 0.837 | 2.25 |
| Example 3 | 0.112 | 0.77 | 0.803 | 0.92 | 0.843 | 2.26 |
| Comparative Example 1 | 0.951 | 9.7 | 7.20 | 10.0 | 14.127 | 16.51 |

Experimental Example 2

0.400 g each of the biochar of Examples 1-3 and Comparative Example 1 is weighed and placed in a 500 mL Erlenmeyer flask, respectively, and 200 mL of a solution having a pH of 10.0 (adjusted with HC1 and NaH) is added. The Erlenmeyer flasks are placed in a thermostat shaking box and shaken at 25° C. for 8 h with a frequency of 200/min. After completion of the shaking, leaving to stand for 16 h, the supernatant is taken out and brought to a volume of 200 mL, and then passed through a 0.45 μm water-based filtration membrane. The elemental contents of Cu, Pb and Ni in the filtrate are determined by ICP-OES, and the results are shown in Table 2:

TABLE 2 content and dissolution rate of dissolved heavy metals in biochar

| | $Cu^{2+}$ | | $Pb^{2+}$ | | $Ni^{2+}$ | |
|---|---|---|---|---|---|---|
| Sample | Dissolution Concentration (mg/g) | Dissolution rate (%) | Dissolution Concentration (mg/g) | Dissolution rate (%) | Dissolution Concentration (mg/g) | Dissolution rate (%) |
| Example 1 | 0.153 | 0.96 | 2.835 | 2.65 | 0.877 | 2.31 |
| Example 2 | 0.144 | 0.98 | 2.337 | 2.68 | 0.838 | 2.33 |
| Example 3 | 0.145 | 0.99 | 2.331 | 2.67 | 0.842 | 2.34 |
| Comparative Example 1 | 0.990 | 10.1 | 7.942 | 11.03 | 4.629 | 15.43 |

Experimental Example 3

0.400 g each of the biochar of Examples 1-3 and Comparative Example 1 is weighed and placed in a 500 mL Erlenmeyer flask, respectively, and 200 mL of a solution of hydrogen peroxide with a mass concentration of 10% is added respectively. The Erlenmeyer flask is placed in a thermostat shaking box and shaken at 25° C. for 8 h with a frequency of 200/min. After completion of the shaking, leaving to stand for 16 h, the supernatant is taken out and brought to a volume of 200 mL, and then passed through a 0.45 μm water-based filtration membrane. The elemental contents of Cu, Pb and Ni in the filtrate are determined by ICP-OES, and the results are shown in Table 3:

TABLE 3 content and dissolution rate of dissolved heavy metals in biochar

| Sample | $Cu^{2+}$ | | $Pb^{2+}$ | | $Ni^{2+}$ | |
|---|---|---|---|---|---|---|
| | Dissolution Concentration (mg/g) | Dissolution rate (%) | Dissolution Concentration (mg/g) | Dissolution rate (%) | Dissolution Concentration (mg/g) | Dissolution rate (%) |
| Example 1 | 0.132 | 0.83 | 0.981 | 1.02 | 0.714 | 1.88 |
| Example 2 | 0.125 | 0.85 | 0.968 | 1.11 | 0.687 | 1.91 |
| Example 3 | 0.122 | 0.84 | 0.978 | 1.12 | 0.695 | 1.93 |
| Comparative Example 1 | 0.976 | 9.96 | 8.647 | 12.01 | 4.629 | 16.96 |

The present invention has been described in detail with reference to preferred embodiments and illustrative examples, but these specific embodiments are only illustrative explanations of the invention, should not be construed as limiting the present invention. Various improvements, substitutions or modifications may be made to the technical disclosure and its embodiments without departing from the spirit and scope of protection of the present invention, all falling within the scope of protection of the invention as set forth in the appended claims.

What is claimed is:

1. A biochar for stable solidification of heavy metals, wherein the biochar is produced by a process comprising: providing an aquatic plant biomass cultivated in sewage containing heavy metals; wet blending the aquatic plant biomass with clay minerals to form a mixture, wherein the clay minerals comprise attapulgite and montmorillonite, and wherein a dry weight ratio of the attapulgite, the montmorillonite, and the aquatic plant biomass is (0.5-5.0):(0.2-3.0):1; and co-pyrolyzing the mixture.

2. The biochar according to claim 1, wherein the aquatic plant biomass is any one or more of emergent plant biomass, floating leaf plant biomass, submerged plant biomass, floating plant biomass.

3. The biochar according to claim 1, wherein the sewage containing heavy metals further comprises a chelating agent that is Fe-EDTA or EDTA-2Na.

4. The biochar according to claim 3, wherein the concentration of sodium in EDTA-2Na is 50-150 mg/L.

5. The biochar according to claim 4, wherein the heavy metals in the sewage include copper, lead, and nickel, and wherein; the concentration of copper is 300-500 mg/L, the concentration of lead is 100-400 mg/L, and the concentration of nickel is 300-600 mg/L.

6. The biochar according to claim 1, wherein wet blending is carried out by:

forming a suspension of the attapulgite in water, wherein the weight of the attapulgite is 30-70% of the water; adding montmorillonite to the suspension of attapulgite, stirring for 2-8 h to form a suspension solution; adding the aquatic plant biomass to the suspension solution, stirring for 3-10 h, and keeping in an environment of 50-100° C. for 3-12 h.

7. The biochar according to claim 1, wherein co-pyrolysis comprises two stages of low temperature pyrolysis and high temperature pyrolysis as follows:

a low temperature pyrolysis stage wherein the pyrolysis temperature is 200-400° C., and the pyrolysis time is 1.0-4.0 h;

a high temperature pyrolysis stage wherein the pyrolysis temperature is 480-750° C., and the pyrolysis time is 0.5-3.0 h.

8. The biochar according to claim 2, wherein the submerged plant biomass is water lettuce biomass, squid biomass, taro biomass, or iris biomass.

9. The biochar according to claim 3, wherein the chelating agent is EDTA-2Na.

* * * * *